(12) United States Patent
Dunseath et al.

(10) Patent No.: US 11,484,117 B2
(45) Date of Patent: Nov. 1, 2022

(54) MOVABLE PLATFORM OF A SUSPENDED STORAGE APPARATUS

(71) Applicant: Ceiling Storage and More Inc., Scottsdale, AZ (US)

(72) Inventors: Dwayne Dunseath, Las Vegas, NV (US); Dylan M. Dunseath, Las Vegas, NV (US); Gary Romig, Reading, PA (US); Jim Yacksyzn, Henderson, NV (US)

(73) Assignee: CEILING STORAGE AND MORE INC., Scottsdale, AZ (US)

( * ) Notice: Subject to any disclaimer, the term of this patent is extended or adjusted under 35 U.S.C. 154(b) by 0 days.

(21) Appl. No.: 17/060,130

(22) Filed: Oct. 1, 2020

(65) Prior Publication Data
US 2021/0037970 A1 Feb. 11, 2021

(51) Int. Cl.
| A47B 57/06 | (2006.01) |
| F16H 19/06 | (2006.01) |
| A47B 5/00 | (2006.01) |
| A47B 51/00 | (2006.01) |

(52) U.S. Cl.
CPC ............ *A47B 57/06* (2013.01); *F16H 19/06* (2013.01); *A47B 2005/003* (2013.01); *A47B 2051/005* (2013.01); *F16H 2019/0677* (2013.01)

(58) Field of Classification Search
CPC .............. A47B 57/06; A47B 2005/003; A47B 2051/003; F16H 19/06
See application file for complete search history.

(56) References Cited

U.S. PATENT DOCUMENTS

| 1,202,166 | A | * | 10/1916 | Corbett | A47F 5/0892 |
| | | | | | 211/117 |
| 7,527,242 | B2 | * | 5/2009 | Shaha | E04H 6/42 |
| | | | | | 182/144 |
| 8,162,159 | B2 | * | 4/2012 | Carter | B66F 11/00 |
| | | | | | 211/117 |
| 8,245,651 | B1 | * | 8/2012 | Mikich | A47F 5/01 |
| | | | | | 108/42 |
| 9,420,884 | B2 | * | 8/2016 | Newman | F16M 13/027 |
| 9,737,140 | B2 | * | 8/2017 | Bondi | A47B 43/006 |
| 10,874,209 | B1 | * | 12/2020 | Dunseath | B65G 1/026 |
| 2004/0123781 | A1 | * | 7/2004 | D'Agostino | A47B 51/00 |
| | | | | | 108/42 |
| 2006/0120846 | A1 | * | 6/2006 | Krengel | A47B 5/00 |
| | | | | | 414/592 |
| 2007/0176524 | A1 | * | 8/2007 | Plano | A47B 77/04 |
| | | | | | 312/247 |
| 2008/0245755 | A1 | * | 10/2008 | Carter | A47B 46/005 |
| | | | | | 211/117 |

(Continued)

*Primary Examiner* — Daniel J Rohrhoff
(74) *Attorney, Agent, or Firm* — Bayramoglu Law Offices LLC

(57) ABSTRACT

A storage apparatus includes a pully system, a moveable platform, X-bars, a lowering and lifting means and attachment elements. The platform includes at least one support tray and side and end platform supports. The pully system includes at least one pully, a lowering and raising mechanism and at least one rope or cable, where the rope or cable is attached to at least one pully support. The lowering and lifting means turns the lowering and raising mechanism such that the rope or cable moves over pullies in the pully system to raise and lower the platform of the storage apparatus.

9 Claims, 27 Drawing Sheets

(56) References Cited

U.S. PATENT DOCUMENTS

| | | | |
|---|---|---|---|
| 2014/0354126 A1* | 12/2014 | DeLorean | F24F 13/20 |
| | | | 312/236 |
| 2015/0216298 A1* | 8/2015 | DeLorean | F24F 13/20 |
| | | | 312/236 |
| 2015/0272323 A1* | 10/2015 | Klooth | A47B 51/00 |
| | | | 182/144 |
| 2016/0278517 A1* | 9/2016 | DeLorean | E04B 9/02 |

* cited by examiner

MOVABLE PLATFORM OF A SUSPENDED STORAGE APPARATUS

CROSS-REFERENCE TO RELATED APPLICATIONS

This application is a continuation in part of U.S. patent application Ser. No. 16/536,303, filed on Aug. 8, 2019, the entire contents of which are incorporated herein by reference.

TECHNICAL FIELD

The present invention relates to the technical field of storage devices. More specifically, the present invention is a storage apparatus which is suspended from a support structure and a pully system lowers and raises a platform of the storage apparatus.

BACKGROUND

Many prior art suspended storages devices are not expandable or contractable nor have a platform which is lowered or raised. Also, many prior art suspended storages devices are placed in a location that is too high off the ground for a person to remove storage items from the suspended storage device or to place items onto the suspended storage device. Many prior art storages devices are a fixed (i.e. non expandable or contractable) suspended storage device which is fixed to a ceiling. After installing a suspended storage device to the ceiling, the items in or on the suspended storage device are not accessible to a user without a latter or some other device which the user needs to climb up or onto in order to reach the items in the suspended storage device because the suspended storage device is too far above the floor for the user to reach his or her items. Therefore, a person requires the use of a latter or similar device to access the items stored in the suspended storage device and to place items to be stored in the suspended storage device. Furthermore, many hazards and accidents have occurred and continue to occur while climbing a latter with heavy and awkward storage items which are to be placed on or have been taken from the suspended storage device.

Therefore, Applicant has invented a storage apparatus which solves the problem of placing storage items on and accessing storage items from the storage apparatus without having to climb up a latter. Applicant's storage apparatus allows a user to place storage items on and remove storage items from the storage apparatus without having to climb up a latter by having a platform of the storage apparatus being moveable in a lowered and raised manner. Since Applicant's platform of the storage apparatus can be lowered and raised, a user of the storage apparatus is able to stand on the ground/floor (i.e. stand at ground/floor level) and place item(s) on the storage apparatus and/or remove item(s) from the storage apparatus without using a latter or any other similar device.

SUMMARY

An object of the present invention is to provide a storage apparatus which solves the technical problems in the prior art that a latter is required to access the items stored in the suspended storage device/apparatus and to place items to be stored in the suspended storage device/apparatus.

The present invention is a storage apparatus designed to be attached to a support structure, where the support structure is a roof, ceiling, joists, walls or other similar supporting devices.

The storage apparatus comprising a platform, wherein the platform can be lowered and raised. The platform comprises at least one support tray with apertures in at least one of the support trays or in each of the support trays or in any desired number of trays in order to reduce the lifting weight which the means for lowering and raising the platform has to lift as well as provide cooling or heating via air flow to a particular item(s) stored on the support tray(s) which requires cooling or heating. This weight reduction allows the means for lowering and raising the platform to become smaller which also reduces the weight of the storage apparatus which allows for more storage items to be located on the platform as well as for heavier storage items to be located on the platform. Also, the apertures' shape, size and arrangement provided on a tray or on each of the trays are such that each tray is balanced in the horizontal plane (i.e. the plane parallel to the mounting structure), reduce stress on the storage apparatus, and reduce stress on supports for the storage apparatus. For example, the apertures may be circular, square, triangular or any other geometric or polygonal shape and are arranged on a tray or on each of the trays in a uniform spacing, a non-uniform spacing or are concentrated (more closely spaced together) more in one area/region of the tray or trays than in another area/region of the tray or trays. The sizes of the holes for example, may have a diameter or a hydraulic diameter in the range of one sixteenth of an inch to five inches but could be sizes smaller and larger than one sixteenth of an inch and five inches. Also, the sizes of each aperture may vary in each, some or all of the trays. For example, apertures in a middle tray may having a diameter or a hydraulic diameter of two inches where trays on each side of the middle tray have apertures with a diameter or a hydraulic diameter of one inch or the tray on one side of the middle tray may having a diameter or a hydraulic diameter of one inch where the tray on the other (i.e. another) side of the middle tray may having a diameter or a hydraulic diameter of three inches.

A center support strap is attached to at least one of the support trays. Moreover, a center support strap can be connected and/or fastened to one or each adjacent support trays in order together two or more support trays together.

Side platform support(s) is/are connected/fastened to the side(s) of the tray(s) of the platform. Similarly, end platform support(s) is/are connected/fastened to the end(s) of the tray(s) of the platform. The side platform supports and the end platform supports form a cavity with the platform where the cavity is formed from a top surface of the platform and an inside perimeter of the side platform supports and the end platform supports. The height of the side platform supports and the end platform supports can vary or can be the same. The height of the side platform supports and the end platform supports can be adjusted such that their height can be taller than the items being stored on the platform or their height is less in height than the items being stored on the platform but is tall/high enough to prevent the items being stored on the platform from falling off of the platform.

A platform connector is connect/attached to at least one of the side platform supports or to at least one side of a support tray.

At least one platform support element is attached/connected to a bottom or a top of a tray or trays of the platform.

At least one angle plate and at least one tray mounting bracket are connected/attached to a support tray. However, one angle plate and one tray mounting bracket are connected to a plurality of support trays and can be positioned close/near (i.e. one to ten inches) from the corners (i.e. geometric corners) of the platform.

At least one mounting bracket is connected/attached to at least one of the tray mounting brackets. A first end and/or sides of the mounting bracket can be fastened/attached/connected to one or each of the tray mounting brackets. Preferably, a mounting bracket is connected to each of the tray mounting brackets.

At least one ceiling or wall bracket is fastened/attached/connected to at least one of the mounting brackets. Preferably, a ceiling or wall bracket is fastened/attached/connected to each of the mounting brackets. Each ceiling or wall bracket is fastened/attached/connected to a second end of the mounting bracket.

The storage apparatus comprises a pully and a rope/cable system. At least one pully is mounted on at least one storage support element. Preferably, there are a plurality of pullies and a plurality of storage support elements. More preferably, there are plurality of pullies mounted on each of the outer storage support elements, which are positioned/attached/mounted on a ceiling/rafters. An outer storage support element is a storage support element which has only one adjacent storage support element thereby.

The means for lowering and raising the platform can be any device or tool which turns a lowering and raising mechanism such as a rotary and/or linear actuator, a power tool or machine such as a drill and/or socket or any other equivalent device. The lowering and raising mechanism is positioned on at least one of the outer storage support elements and positioned on the centroid of the outer storage support element. For example, when the outer storage support element is a (uniform) rod, the lowering and raising mechanism is positioned in the middle of the rods' length. Applicant has solved the problem of preventing swaying of the platform, as well as extending the operating life of the lowering and raising mechanism by preventing shear forces from acting on the lowering and raising mechanism, when the platform of the storage apparatus is lowered and/or raised.

A rope or ropes or a cable or cables is/are positioned on the pullies, connected to the means for lowering and raising the platform and attached to at least one pully support such that when the means for lowering and raising the platform turns the lowering and raising mechanism, the platform either lowers or raises. For example, when the lowering and raising mechanism is turned in a clockwise direction, the platform will lower and when the lowering and raising mechanism is turned in a counterclockwise direction, the platform will be raised. However, the turning direction of the lowering and raising mechanism can also operate differently such that when the lowering and raising mechanism is turned in a clockwise direction, the platform will be raised and when the lowering and raising mechanism is turned in a counterclockwise direction the platform will be lowered.

Preferably, there are a plurality of pully supports and each pully support is attached to a support tray and/or a side platform support and/or an end platform support. Each of the two ends of a rope or cable are attached/connected to a pully support. Therefore, when the lowering and raising mechanism is turned in either a clockwise or counterclockwise direction, the rope or cable will wrap around an element of the lowering and raising mechanism. For example, when the lowering and raising mechanism is turned in say a clockwise direction, the rope or cable will wrap around a pully of the lowering and raising mechanism and cause the effective length of the rope or cable to become shortened and therefore raise the platform. Similarly, when the lowering and raising mechanism is turned in say a counterclockwise direction, the rope or cable will unwrap from the pully of the lowering and raising mechanism and cause the effective length of the rope or cable to lengthen and therefore lower the platform.

At least one attachment guide is attached/fastened/connected to the storage support elements and/or the ceiling/rafters. Preferably, there are a plurality of attachment guides attached/fastened/connected to the storage support elements and some of the attachment guides are attached/fastened/connected to both the storage support elements and the ceiling/rafters.

The storage apparatus also includes X-bars. Two pair of X-bars are attached to the storage apparatus. However, there can be more or less than two pair of X-bars attached to the storage apparatus. Each X-bar has a hole therein and the hole is located at the midpoint of the length of the bar. A screw, rivet, fastener or similar fastening device is installed into the holes of the X-bars in order to connect the X-bars together. The X-bars have the same length in order to keep the platform level when lowering or raising the platform. The X-bars are flat bars. Alternatively, the X-bars can be tubular (i.e. circular) shaped or square shaped or any other polygonal shape. The X-bars are made from steel or aluminum or any other metal or a composite metal or a composite material. For one X-bar pair, one end of the X-bars is attached to one of the end platform supports (i.e. a first end platform support) and/or the platform and the other end of the X-bars is attached to one of the storage support elements (i.e. a first storage support element) and/or the ceiling/rafters. In the other pair of X-bars of the two pair of the X-bars, one end the X-bars is connected to one of the end platform supports (i.e. a second end platform support) and/or the platform and the other end of the X-bars is attached to one of the storage support elements (i.e. a second storage support element) and/or the ceiling/rafters.

The attached/fastened/connected of the pairs of X-bars can be used with a fitted bracket or brackets and fasteners in order to reduce lateral forces and therefore reduce the platform from moving in a sideways direction. The X-bars can be permanently attached or removable attached by any known connection method of connecting two elements together such as a weld, screws, rivets, or other fastening devices and methods.

The platform and the storage apparatus are made from a material of steel or aluminum or any other metal or a composite metal or a composite material that provides the ability/strength to hold a distributed weight (i.e. distributed across the platform) capacity from a few pounds of weight up to 1000 pounds of weight or even more than 1000 pounds of weight in order to support the weight of a given or desired use of the storage apparatus. The storage apparatus is approximately four feet in width by seven feet in length. However, the width and/or the length can be shorter or longer than the disclosed four foot width and the seven foot length in order to accommodate the storage apparatus use within a desired location and to meet the required user needs of the quantity and size of the items to be stored. Also, folding legs, pivoting element(s) (i.e. a groove and pin/rod), can be attached to the bottom of the platform and located at each of the corners of the platform in order to help support the load/weight of the storage items installed on the storage apparatus.

The operation of the storage device is disclosed below. When a means rotates, for example in a clockwise direction, (for example a drill, socket and extension) the lowering and raising mechanism, the lowering and raising mechanism coils the rope or cable around a pully of the lowering and raising mechanism where the rope or cable will there effective shorted and the X-bars will move in a folding manner and this will raise the platform in a vertical direction. Similarly, when a means rotates, for example in a counterclockwise direction, (for example a drill, socket and extension) the lowering and raising mechanism, the lowering and raising mechanism unwinds the rope or cable from a pully of the lowering and raising mechanism where the rope or cable will there effective lengthen and the X-bars will move in an unfolding manner and this will lower the platform in a vertical direction.

BRIEF DESCRIPTION OF THE DRAWINGS

In order to more clearly illustrate the embodiments of the present disclosure, a brief description of the drawings is given below. The following drawings are only illustrative of some of the embodiments of the present disclosure and for a person of ordinary skill in the art, other drawings or embodiments may be obtained from these drawings without inventive effort.

DETAILED DESCRIPTION

Figure 1:
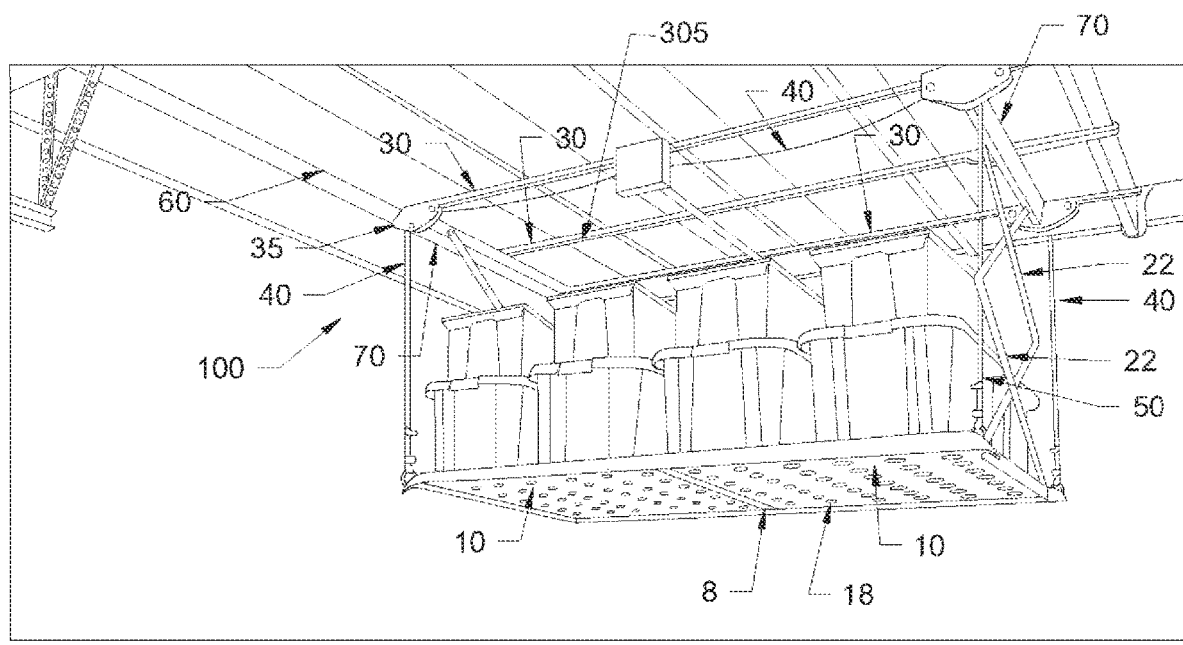
FIG. 1 is a schematic structural diagram of a front perspective view a storage apparatus.
Figure 2:
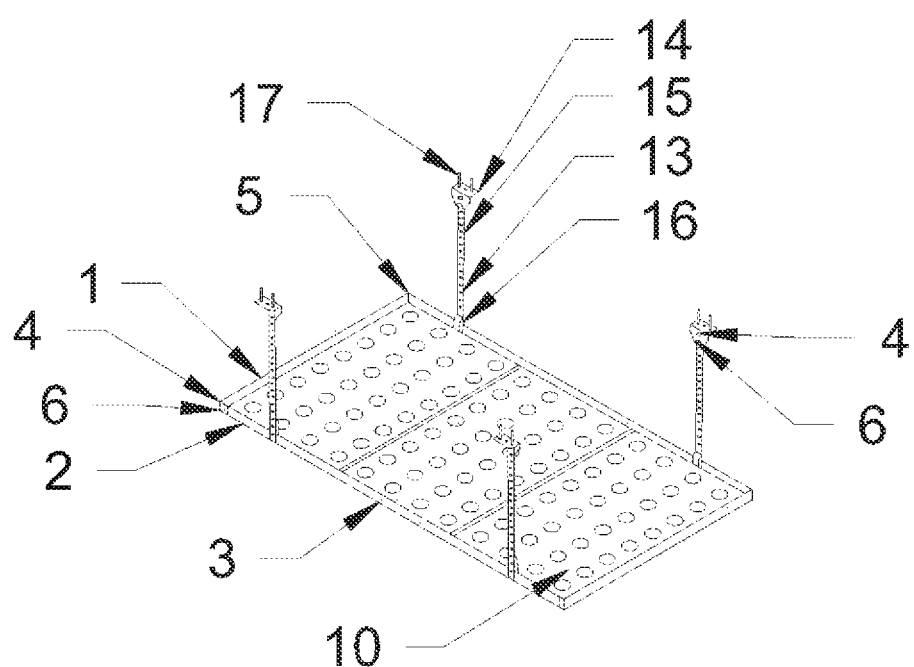
FIG. 2 is a schematic top perspective view of the storage apparatus not installed.
Figure 3:
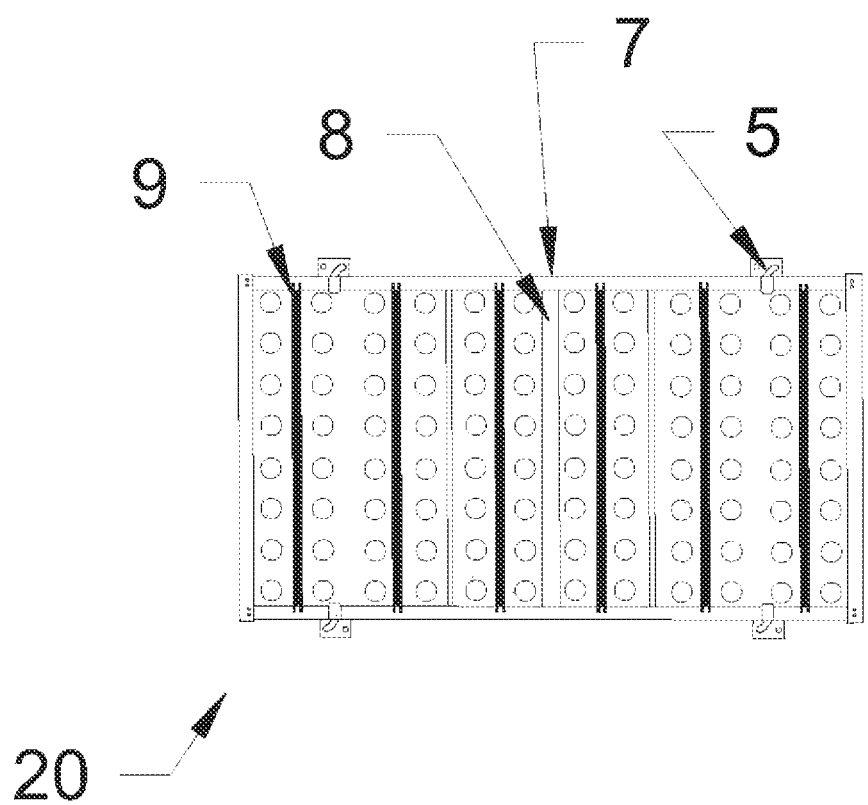
FIG. 3 is a schematic bottom view of a platform of the storage apparatus.
Figure 4:
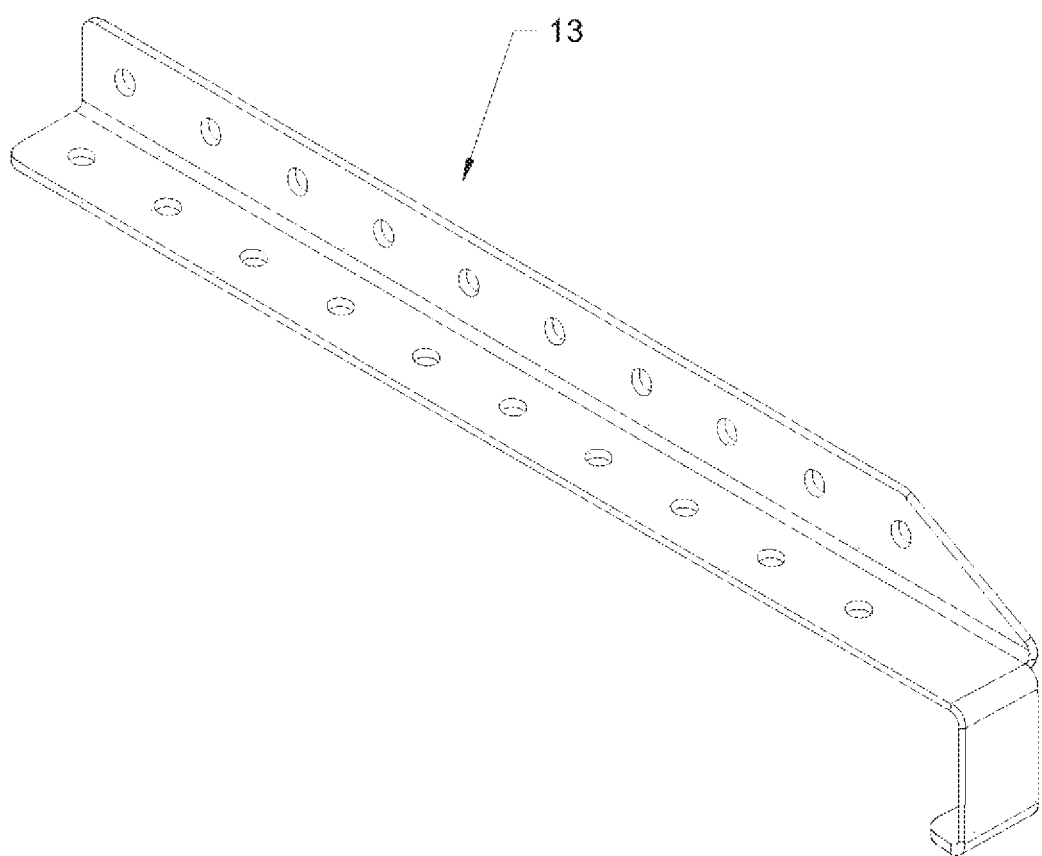
FIG. 4 is a schematic perspective view of a tray mounting bracket of the storage apparatus.
Figure 5:
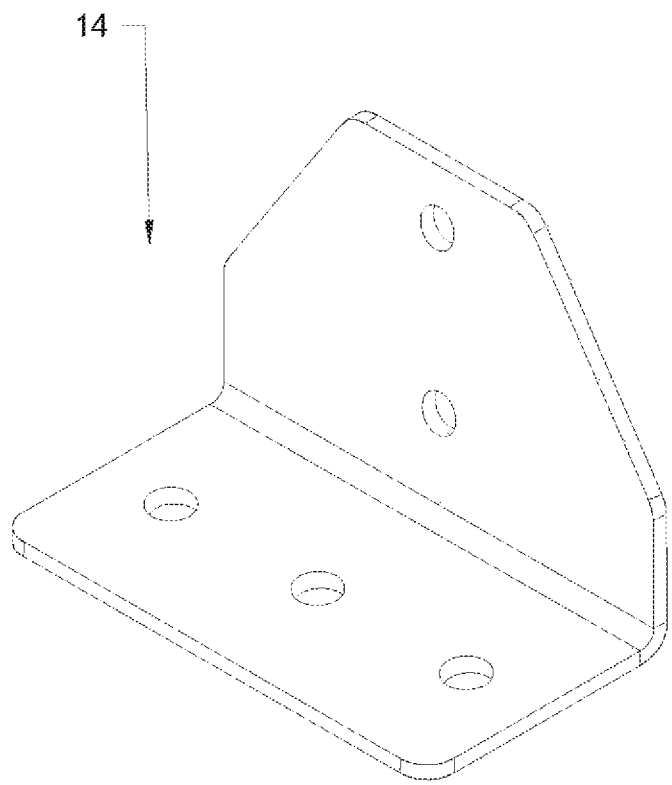
FIG. 5 is a schematic perspective view of a ceiling wall bracket of the storage apparatus.
Figure 6:
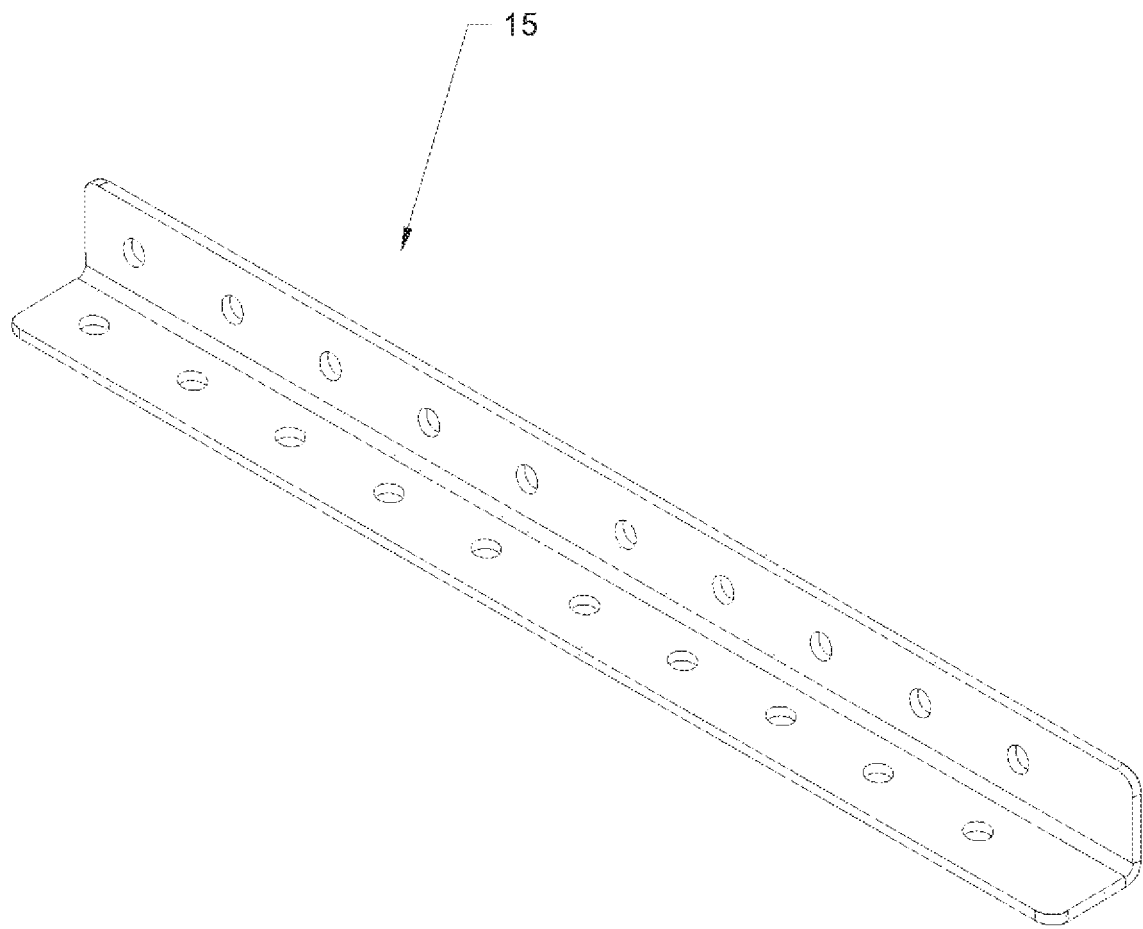
FIG. 6 is a schematic perspective view of a mounting bracket of the storage apparatus.
Figure 7:
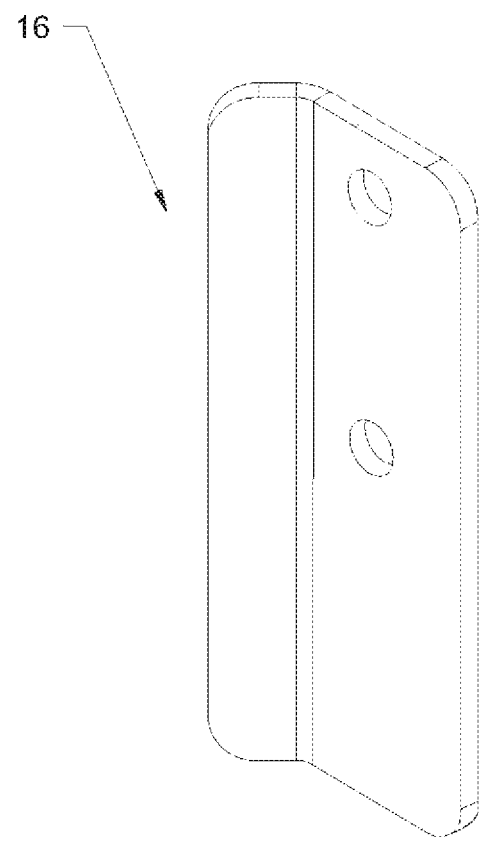
FIG. 7 is a schematic perspective view of an angle plate of the storage apparatus.
Figure 8:
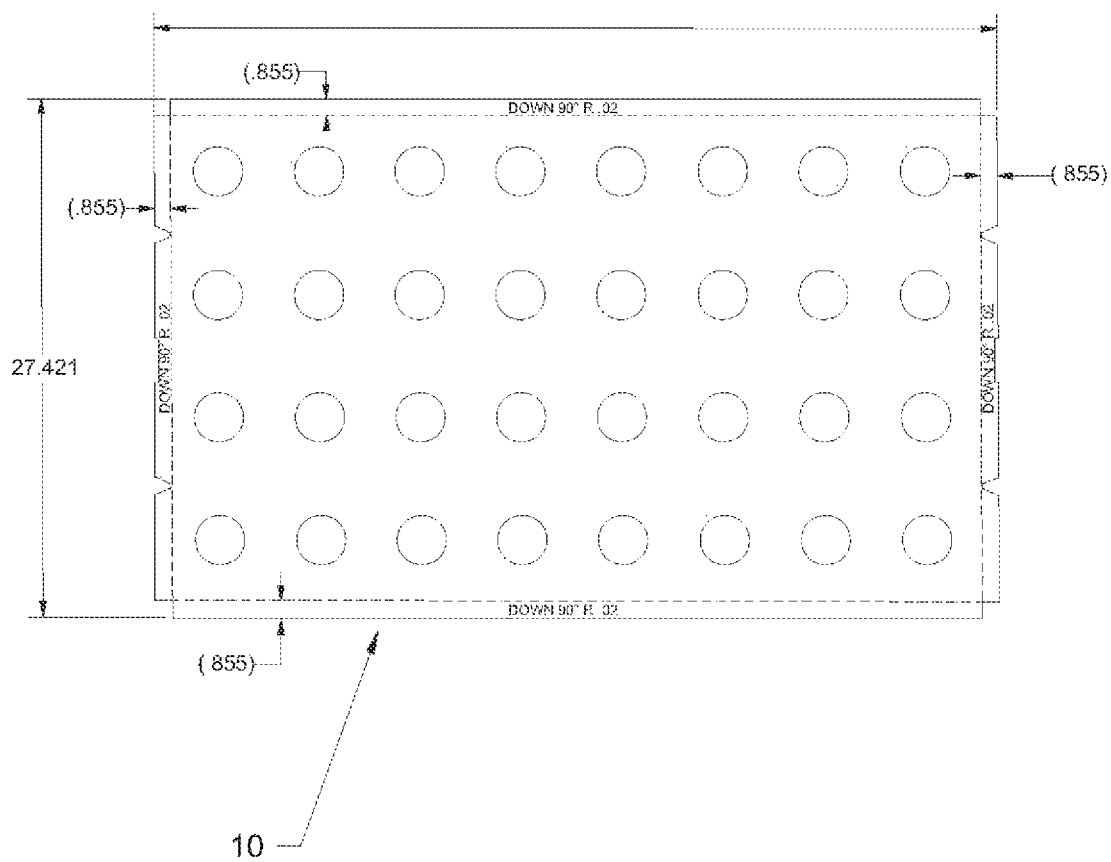
FIG. 8 is a schematic perspective view of support trays of the storage apparatus.
Figure 9:
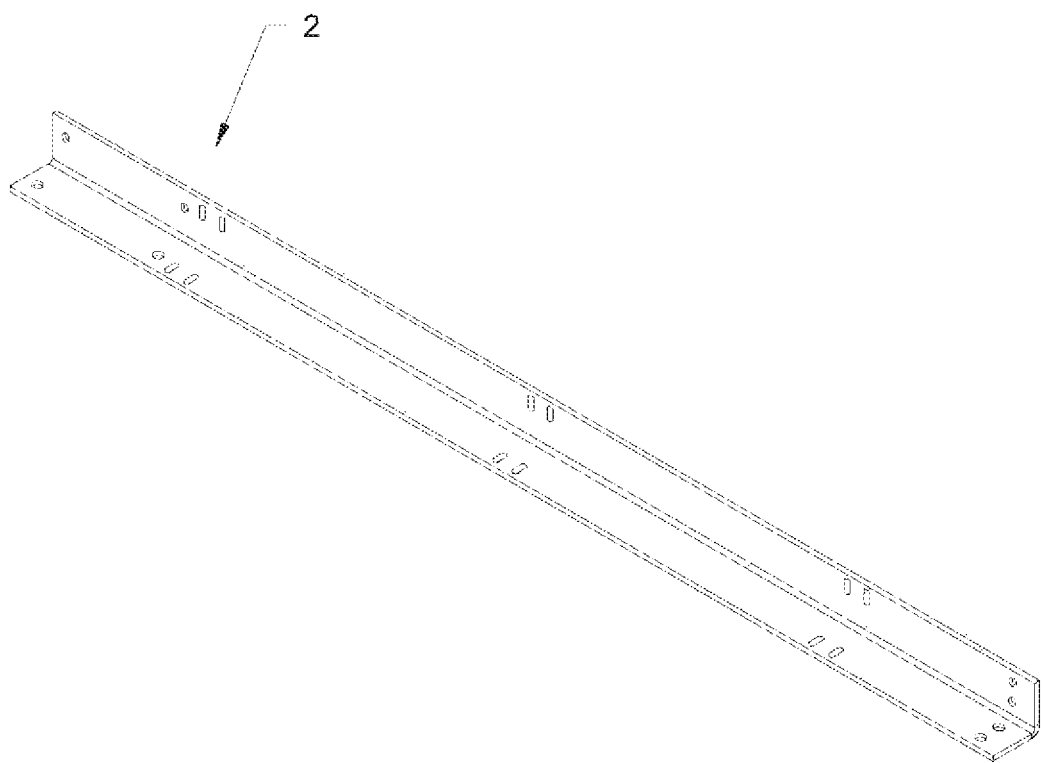
FIG. 9 is a schematic perspective view of one of the side platform supports of the storage apparatus.
Figure 10:
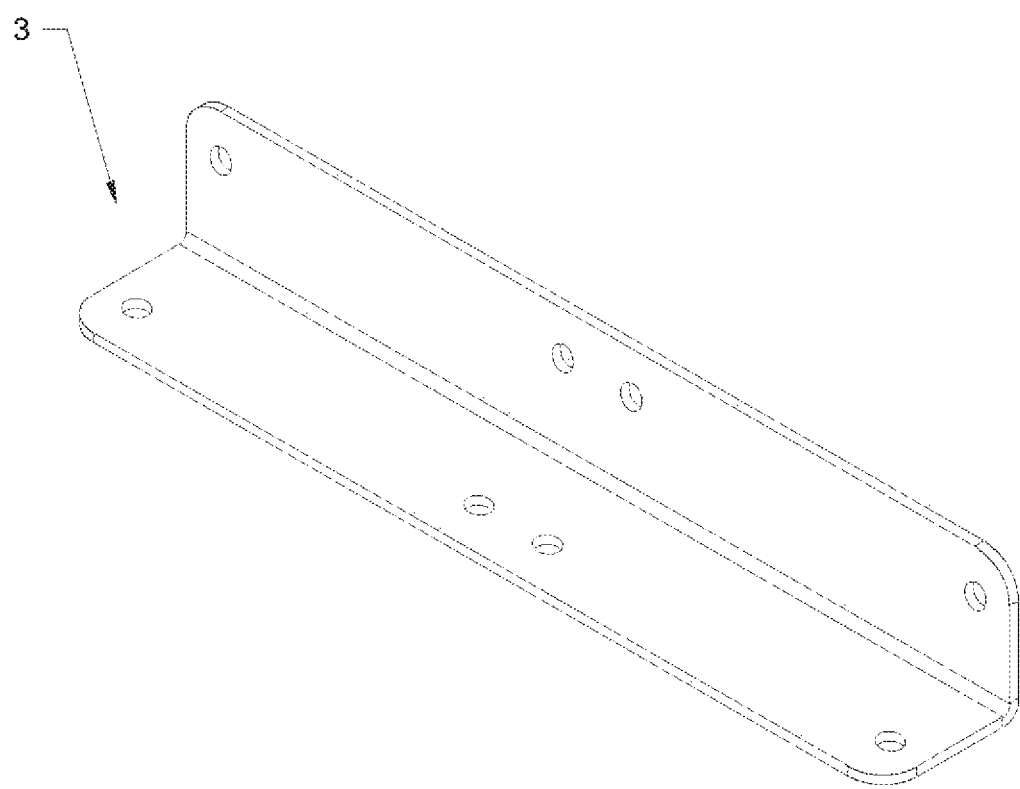
FIG. 10 is a schematic perspective view of a platform connector of the storage apparatus.
Figure 11:
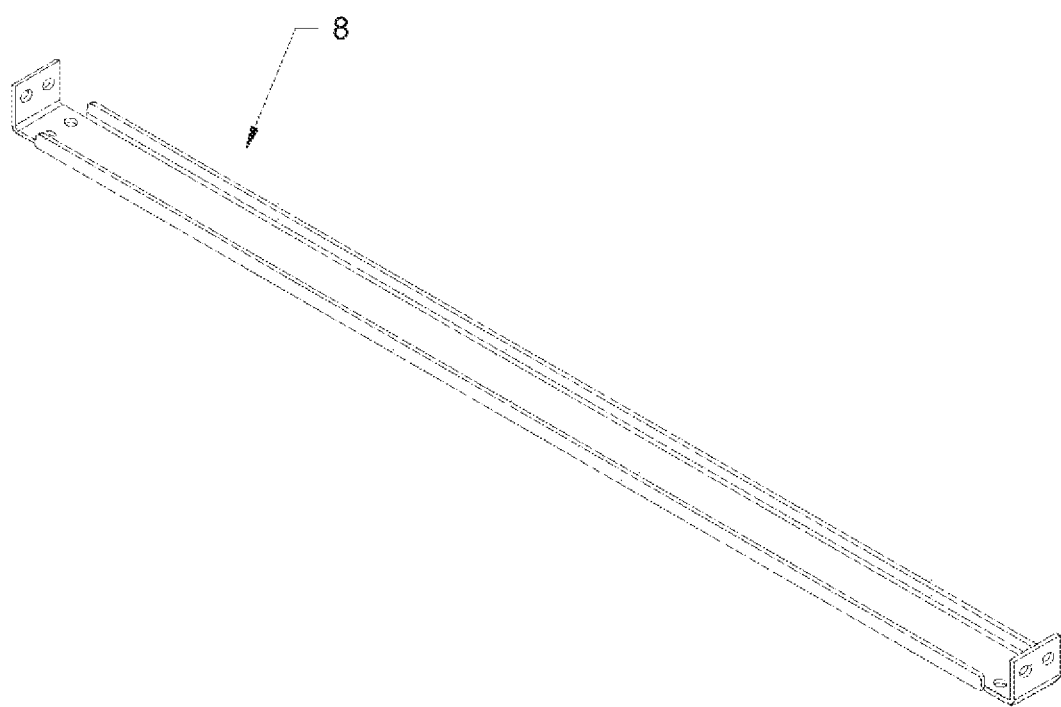
FIG. 11 is schematic perspective view of a center support strap of the storage apparatus.
Figure 12:
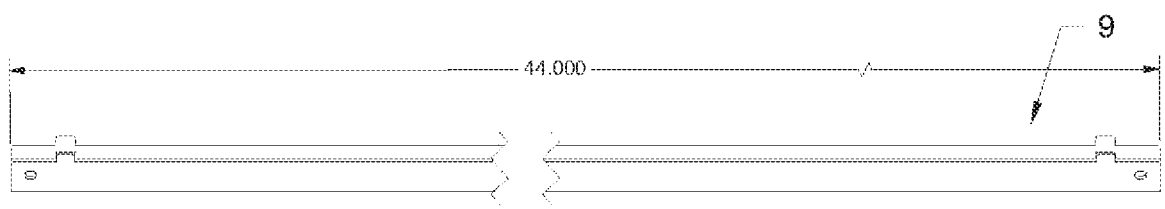
FIG. 12 is a schematic perspective view of a platform support element of the storage apparatus.
Figure 13:
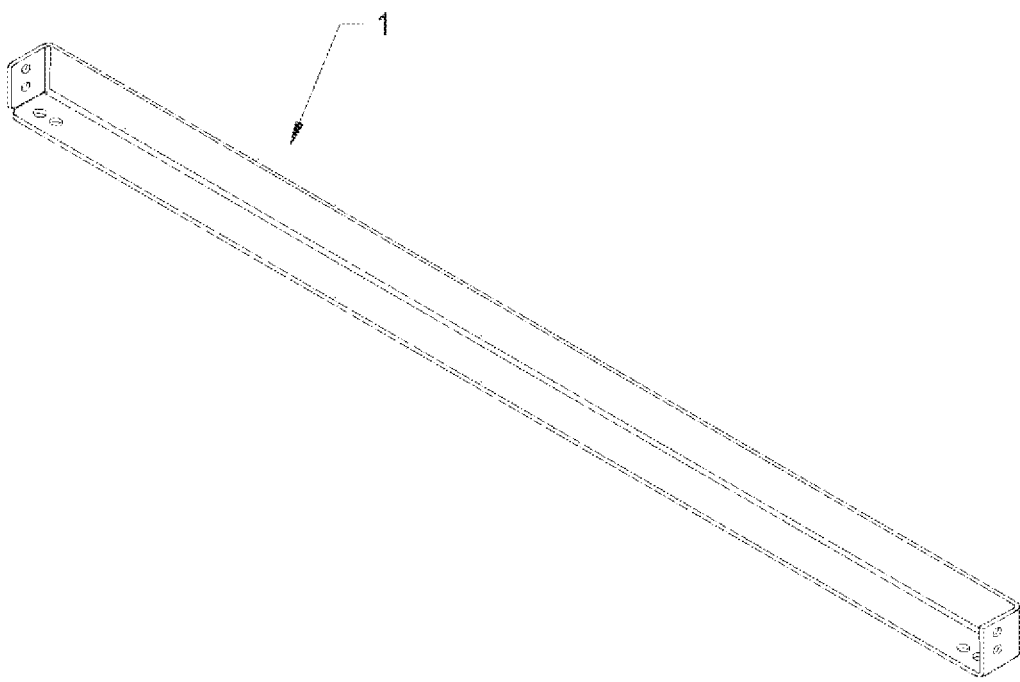
FIG. 13 is a schematic perspective view of one of the end platform supports of the storage apparatus.
Figure 14:
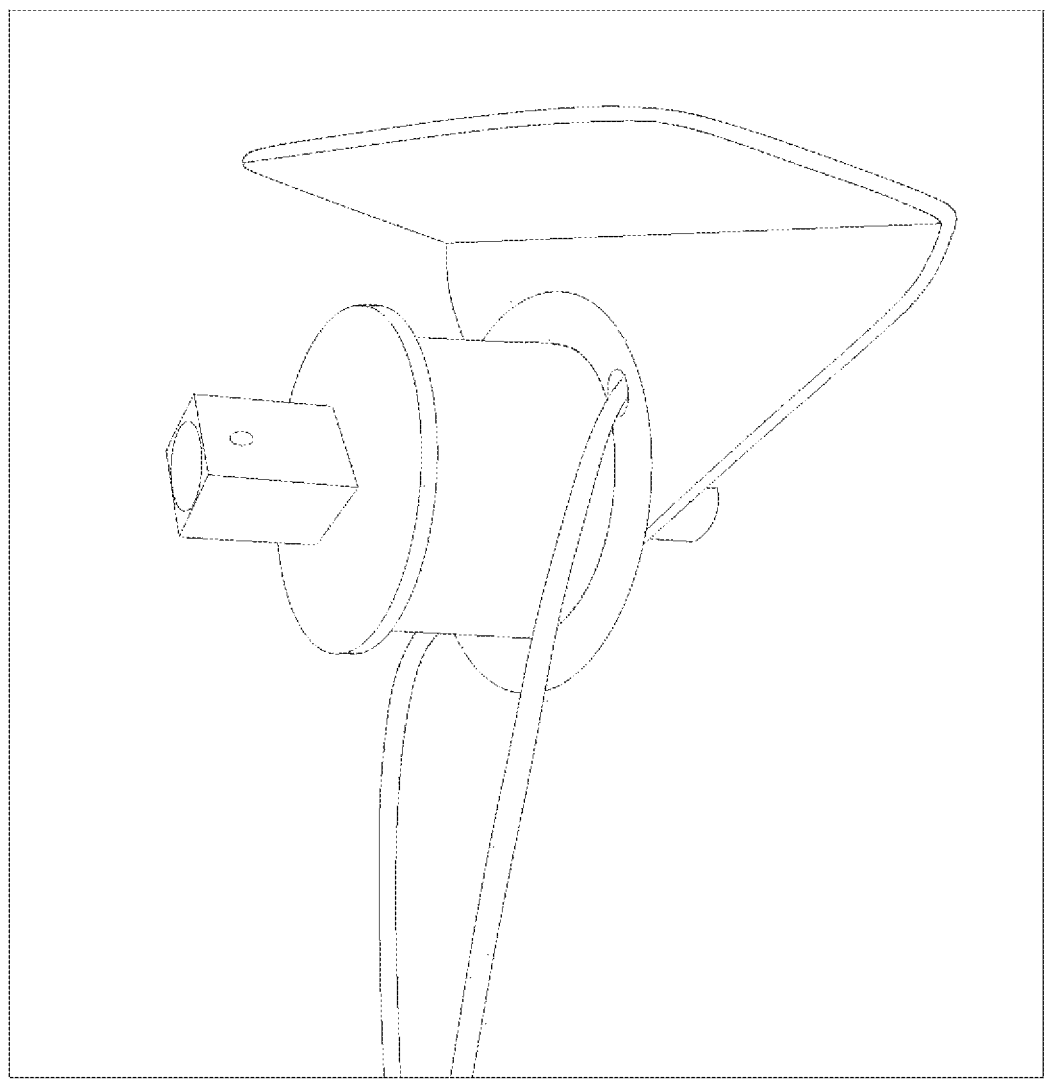
FIG. 14 is a schematic perspective view a pully.
Figure 15:
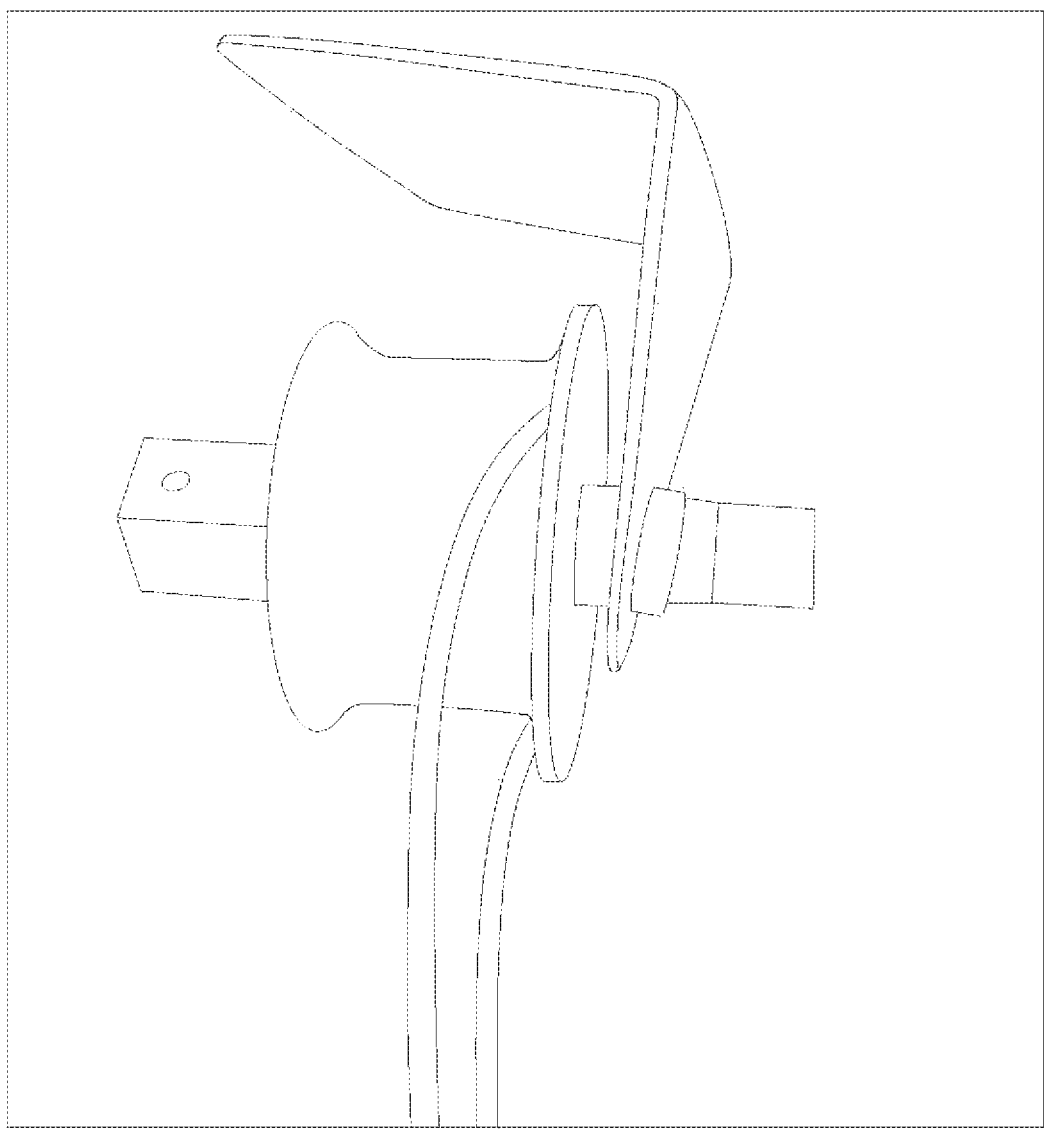
FIG. 15 is a schematic side view of the pully.

The technical solutions of the present disclosure will be clearly and completely described below with reference to the drawings. The embodiments described are only some of the embodiments of the present disclosure, rather than all of the embodiments. All other embodiments that are obtained by a person of ordinary skill in the art on the basis of the embodiments of the present disclosure without inventive effort shall be covered by the protective scope of the present disclosure.

In the description of the present disclosure, it is to be noted that the orientational or positional relation denoted by the terms such as "center", "upper", "lower", "left", "right", "vertical", "horizontal", "inner" and "outer" is based on the orientation or position relationship indicated by the figures, which only serves to facilitate describing the present disclosure and simplify the description, rather than indicating or suggesting that the device or element referred to must have a particular orientation, or is constructed or operated in a particular orientation, and therefore cannot be construed as a limitation on the present disclosure. In addition, the terms "first", "second" and "third" merely serve the purpose of description and should not be understood as an indication or implication of relative importance.

In the description of the present disclosure, it should be noted that unless otherwise explicitly specified and defined, the terms "install", "link" and "connect" shall be understood in the broadest sense, which may, for example, refer to fixed connection, detachable connection or integral connection; may refer to mechanical connection or electrical connection; may refer to direct connection or indirect connection by means of an intermediate medium; and may refer to communication between two elements. A person of ordinary skill in the art would understand the specific meaning of the terms in the present disclosure according to specific situations.

The present invention of a storage apparatus having a moveable platform is described in detail below in reference to the figures.

FIGS. 1-27 illustrates the present invention where the present invention is a storage apparatus 100 designed to be attached to a support structure 60. The support structure 60 is a roof, ceiling, joists, rafters or other similar supporting devices.

All of the below structural element attachments, connections and fastenings can be made with rivets, any type of screw(s) or bolt(s) and nut(s) through aperture(s), welds, soldering, glues, epoxies, adhesives or any other equivalent methods and devices of connecting elements or devices together.

The storage apparatus 100 comprising a platform 20, wherein the platform 20 can be lowered and raised. The platform 20 comprises at least one support tray 10 with apertures 18 in at least one of the support trays 10 or in each of the support trays 10 or in any desired number of trays 10 in order to reduce the lifting weight which the means for lowering and raising the platform 20 has to lift as well as provide cooling or heating via air flow to a particular item(s) stored on the support tray(s) 10 which requires cooling or heating. This weight reduction allows the means for lowering and raising the platform to become smaller which also reduces the weight of the storage apparatus 100 which allows for more storage items to be located on the platform 20 as well as for heavier storage items to be located on the platform 20. Also, the apertures' 18 shape, size and arrangement provided on a tray 10 or on each of the trays 10 are such that each tray 10 is balanced in the horizontal plane (i.e. the plane parallel to the mounting structure), reduce stress on the storage apparatus 100, and reduce stress on supports for the storage apparatus 100. For example, the apertures 18 may be circular, square, triangular or any other geometric or polygonal shape and are arranged on a tray 10 or on each of the trays 10 in a uniform spacing, a non-uniform spacing or are concentrated (more closely spaced together) more in one area/region of the tray 10 or trays 10 than in another area/region of the tray 10 or trays 10. The sizes of the apertures 18 for example, may have a diameter or a hydraulic diameter in the range of one sixteenth of an inch to five inches but could be sizes smaller and larger than one sixteenth of an inch and five inches. Also, the sizes of each aperture 18 may vary in each, some or all of the trays 10. For example, apertures 18 in a middle tray 10 may having a diameter or a hydraulic diameter of two inches where trays 10 on each side of the middle tray 10 have apertures 18 with a diameter or a hydraulic diameter of one inch or the tray 10 on one side of the middle tray 10 may having a diameter or a hydraulic diameter of one inch where the tray 10 on the other (i.e. another) side of the middle tray 10 may having a diameter or a hydraulic diameter of three inches.

A center support strap 8 is attached to at least one of the support trays 10. Moreover, a center support strap 8 can be connected and/or fastened to one or each adjacent support trays 10 in order together two or more support trays 10 together.

Side platform support(s) 2 is/are connected/fastened to the side(s) of the tray(s) 10 of the platform 20. Similarly, end platform support(s) 1 is/are connected/fastened to the end(s) of the tray(s) 10 of the platform 20. The side platform supports 2 and the end platform supports 1 form a cavity with the platform 20 where the cavity is formed from a top surface of the platform 20 and an inside perimeter of the side platform supports 2 and the end platform supports 1. The height of the side platform supports 2 and the end platform supports 1 can vary or can be the same. The height of the side platform supports 2 and the end platform supports 1 can be adjusted such that their height can be taller than the items being stored on the platform 20 or their height is less in height than the items being stored on the platform 20 but is tall/high enough to prevent the items being stored on the platform 20 from falling off of the platform 20.

A platform connector 3 is connect/attached to at least one of the side platform supports 2 or to at least one side of a support tray 10.

Figure 26:
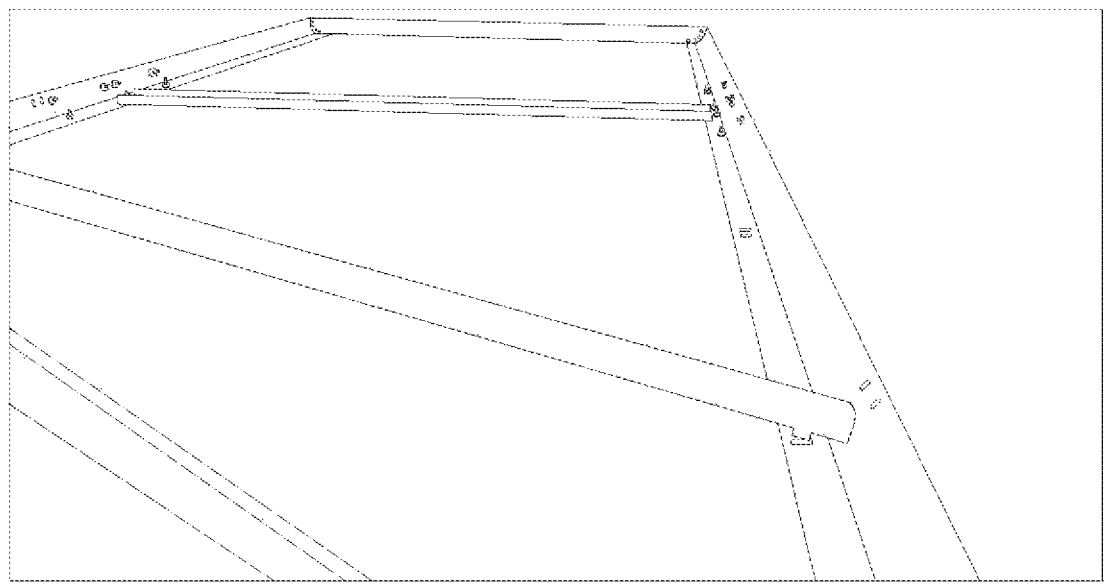
FIG. 26 is a schematic perspective view of the platform.
Figure 27:
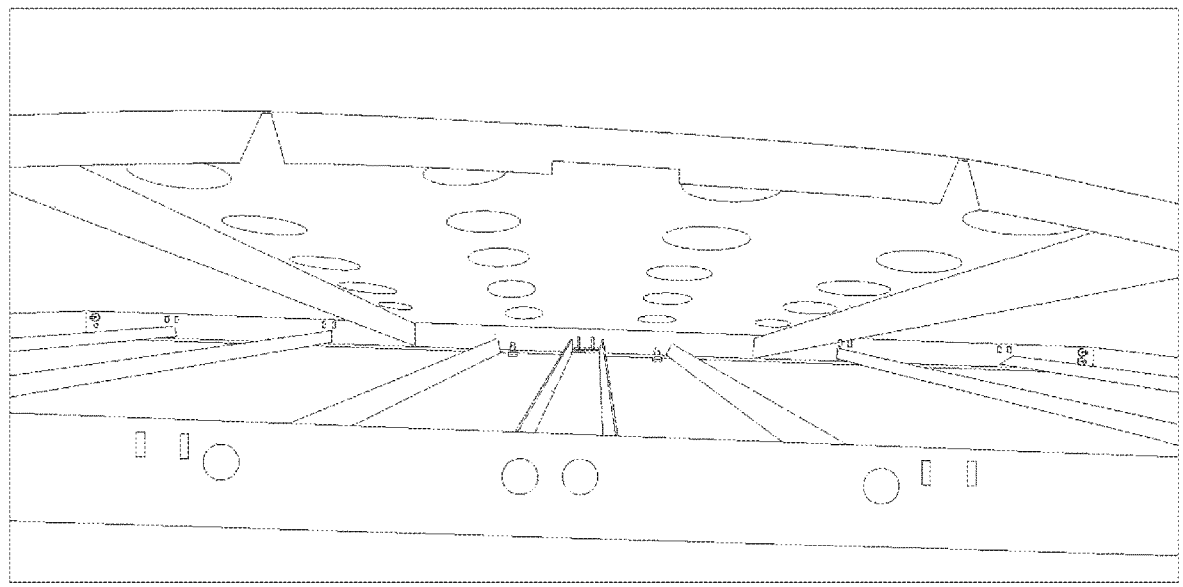
FIG. 27 is a schematic perspective view of a platform support element and trays of the storage apparatus.

At least one platform support element 9 is attached/connected to a bottom or a top of a tray 10 or trays 10 of the platform 20. As shown in FIG. 26 and FIG. 27, the least one platform support element 9 is inserted into/attached within cut-outs and/or apparatus in the side platform supports 2.

At least one angle plate 16 and at least one tray mounting bracket 13 are connected/attached to a support tray 10. However, one angle plate 16 and one tray mounting bracket 13 are connected to a plurality of support trays 10 and can be positioned close/near (i.e. one to ten inches) from the corners (i.e. geometric corners) of the platform 20. As shown in FIG. 27, at least one notch, such a V-shaped notch, is/are in at least one of the plurality of support trays 10. The shaped of the notch can be any shape such that the notch is in the shape which is the same shape as the platform support element 9.

At least one mounting bracket 15 is connected/attached to at least one of the tray mounting brackets 13. A first end and/or sides of the mounting bracket 15 can be fastened/attached/connected to one or each of the tray mounting brackets 13. Preferably, a mounting bracket 15 is connected to each of the tray mounting brackets 13.

At least one ceiling or wall bracket 14 is fastened/attached/connected to at least one of the mounting brackets 15. Preferably, a ceiling or wall bracket 14 is fastened/attached/connected to each of the mounting brackets 15. Each ceiling or wall bracket 14 is fastened/attached/connected to a second end of the mounting bracket 15.

Figure 16:
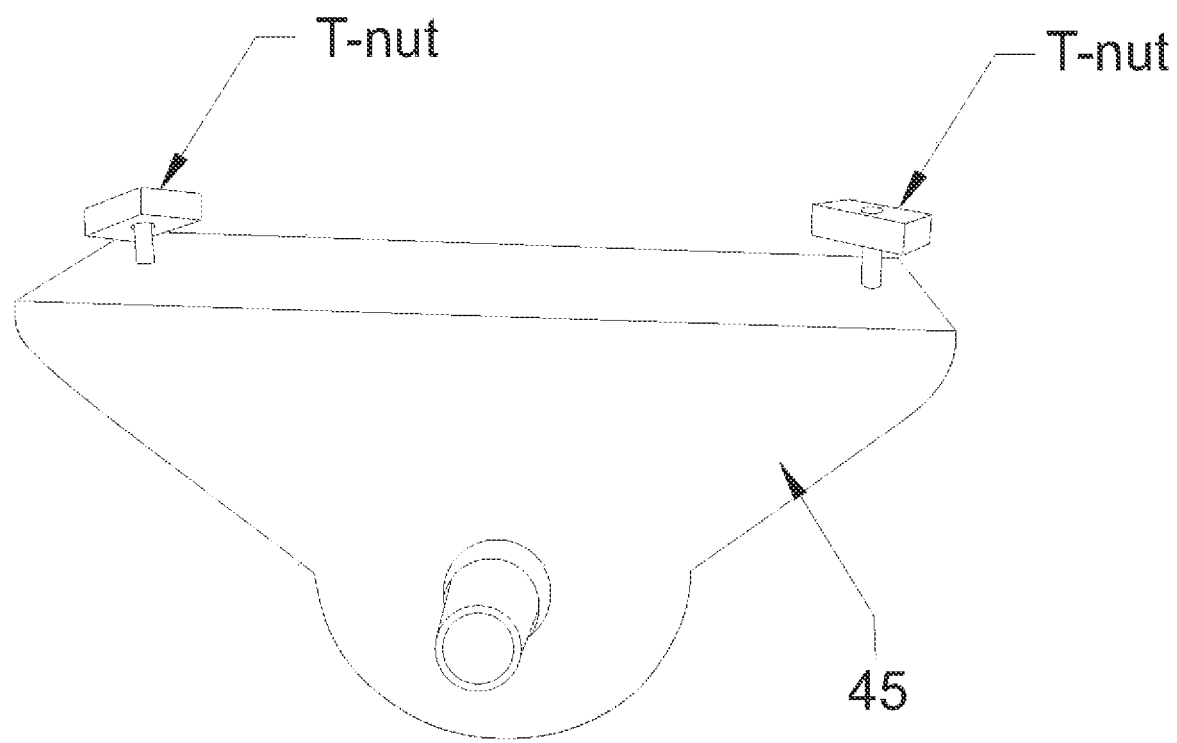
FIG. 16 is a schematic view of a support bracket.
Figure 17:
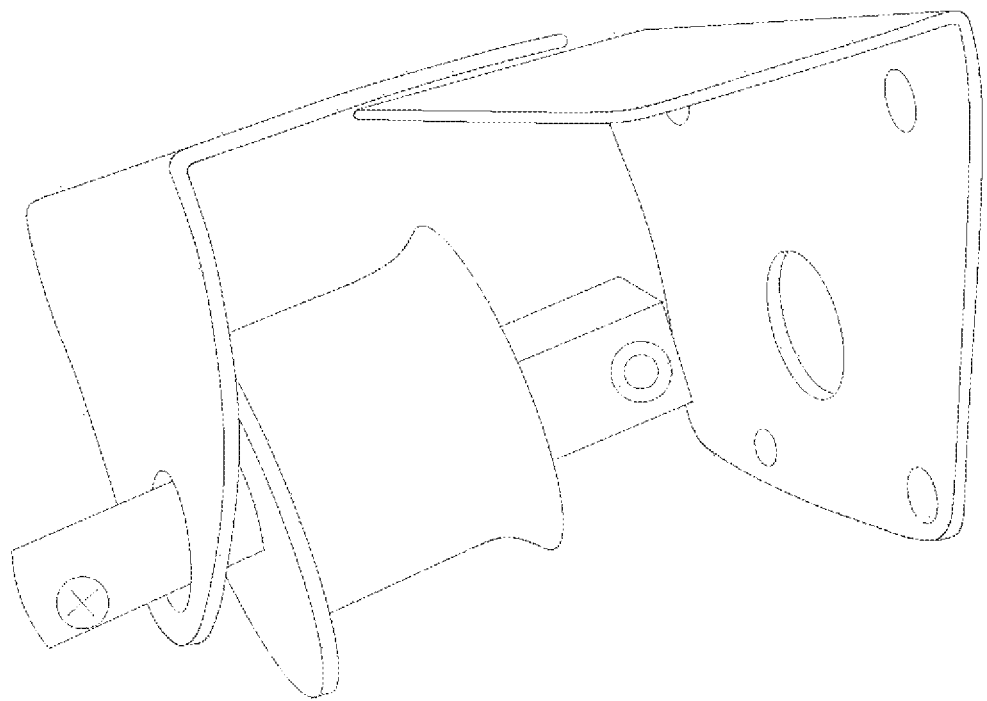
FIG. 17 is a schematic perspective view of the pully and pully mounting brackets.
Figure 18:
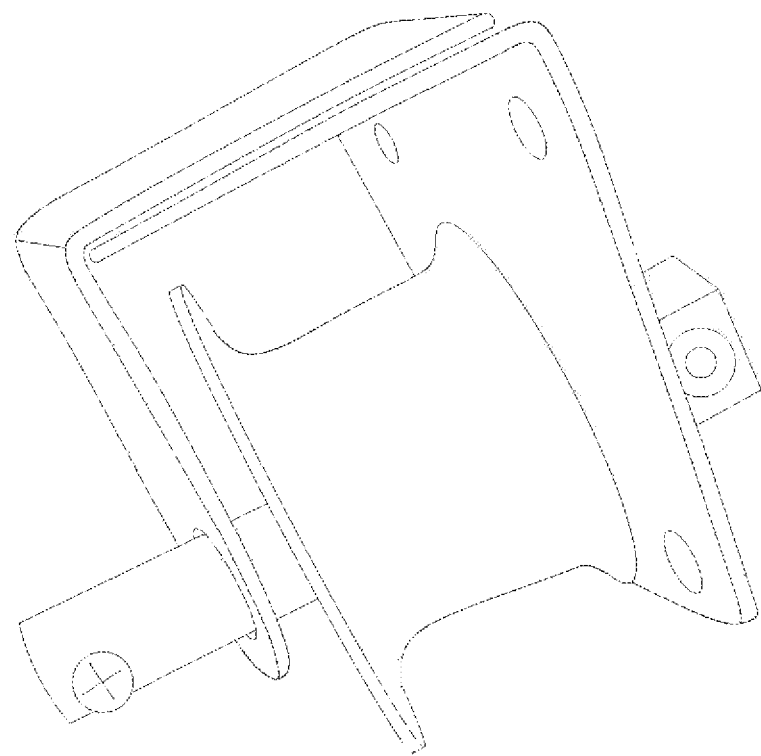
FIG. 18 is a schematic perspective view of the pully and the pully mounting brackets nested for mounting/installation.
Figure 19:
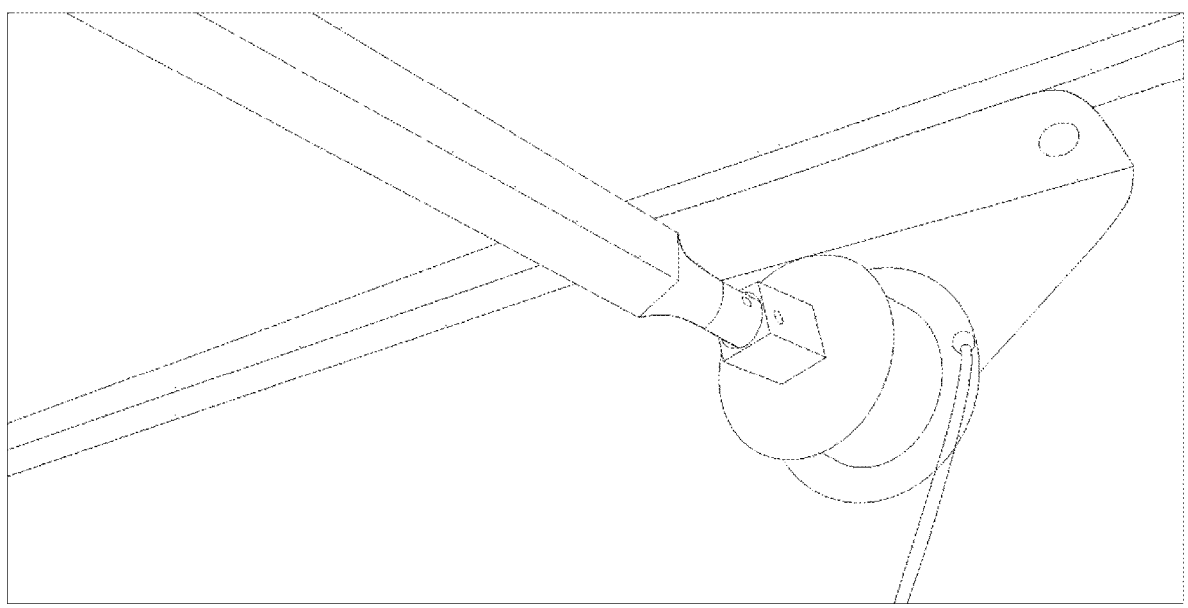
FIG. 19 is a schematic perspective view of the pully installed on the storage apparatus.
Figure 20:
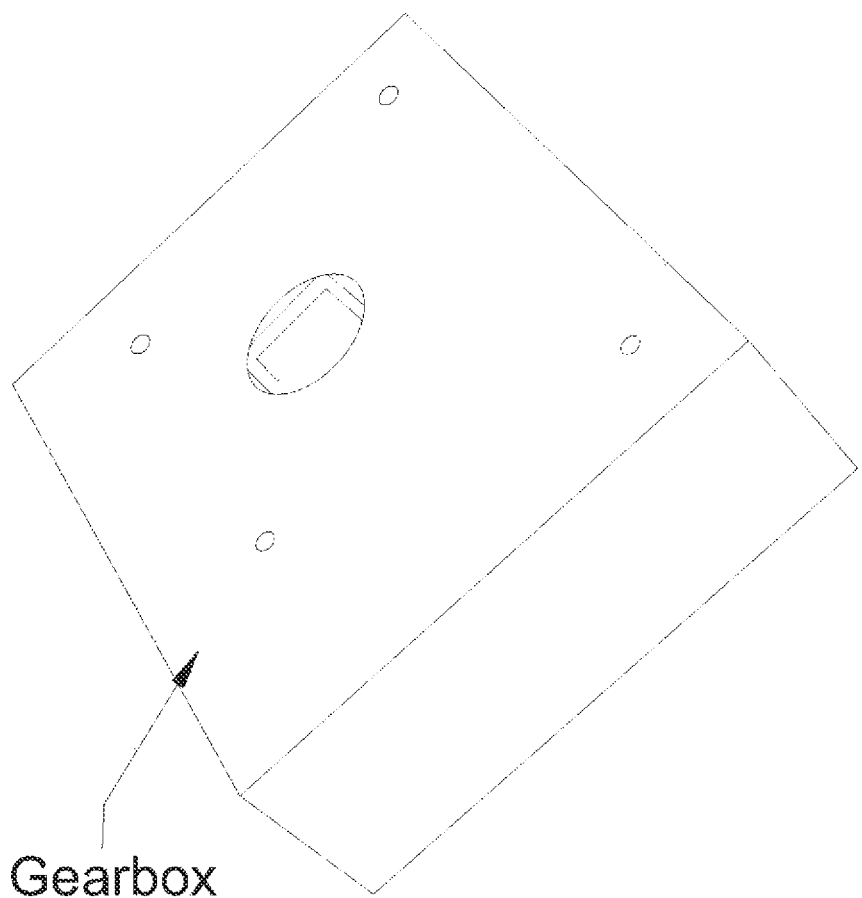
FIG. 20 is a schematic perspective view of a gear box.
Figure 21:
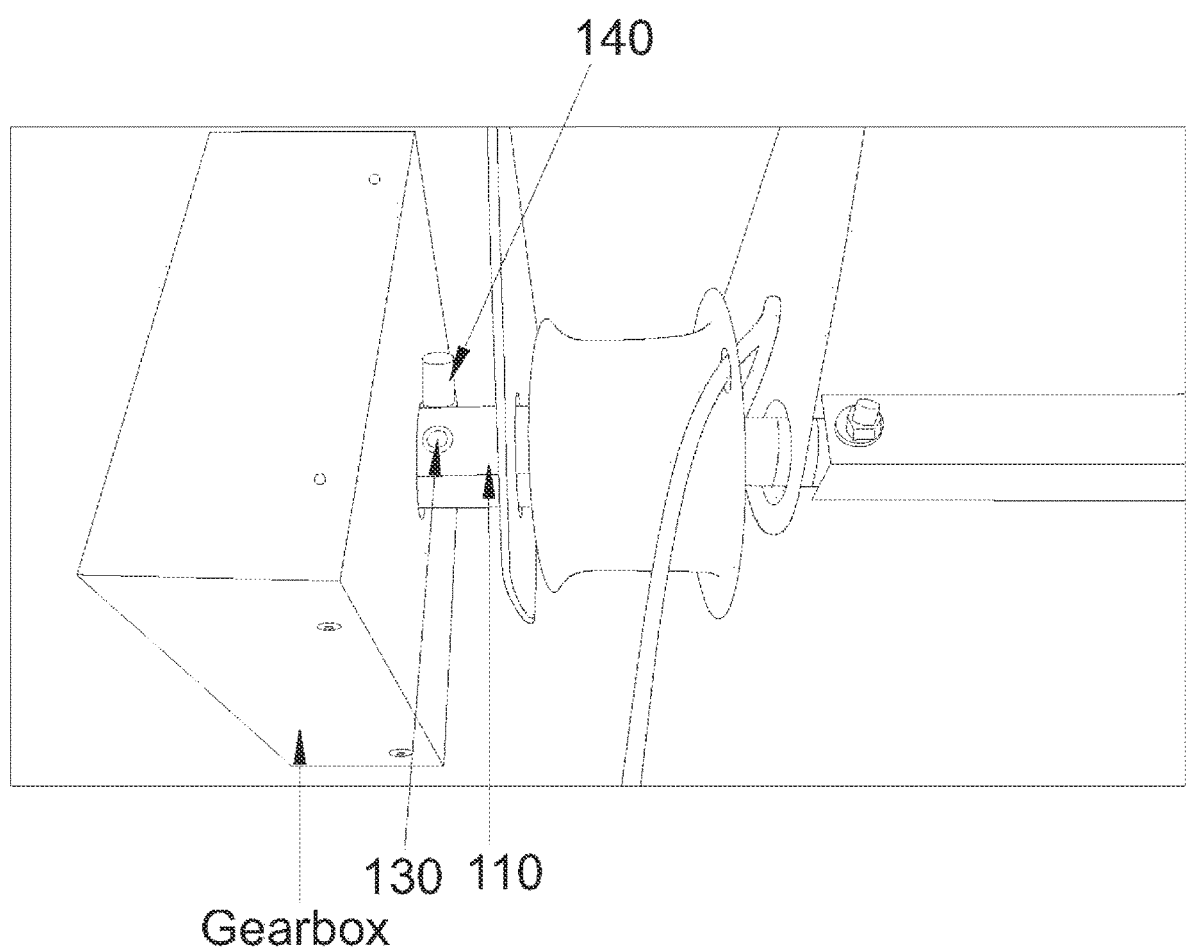
FIG. 21 is a schematic perspective view of the pully connected to the gear box and an elongated member.
Figure 22:
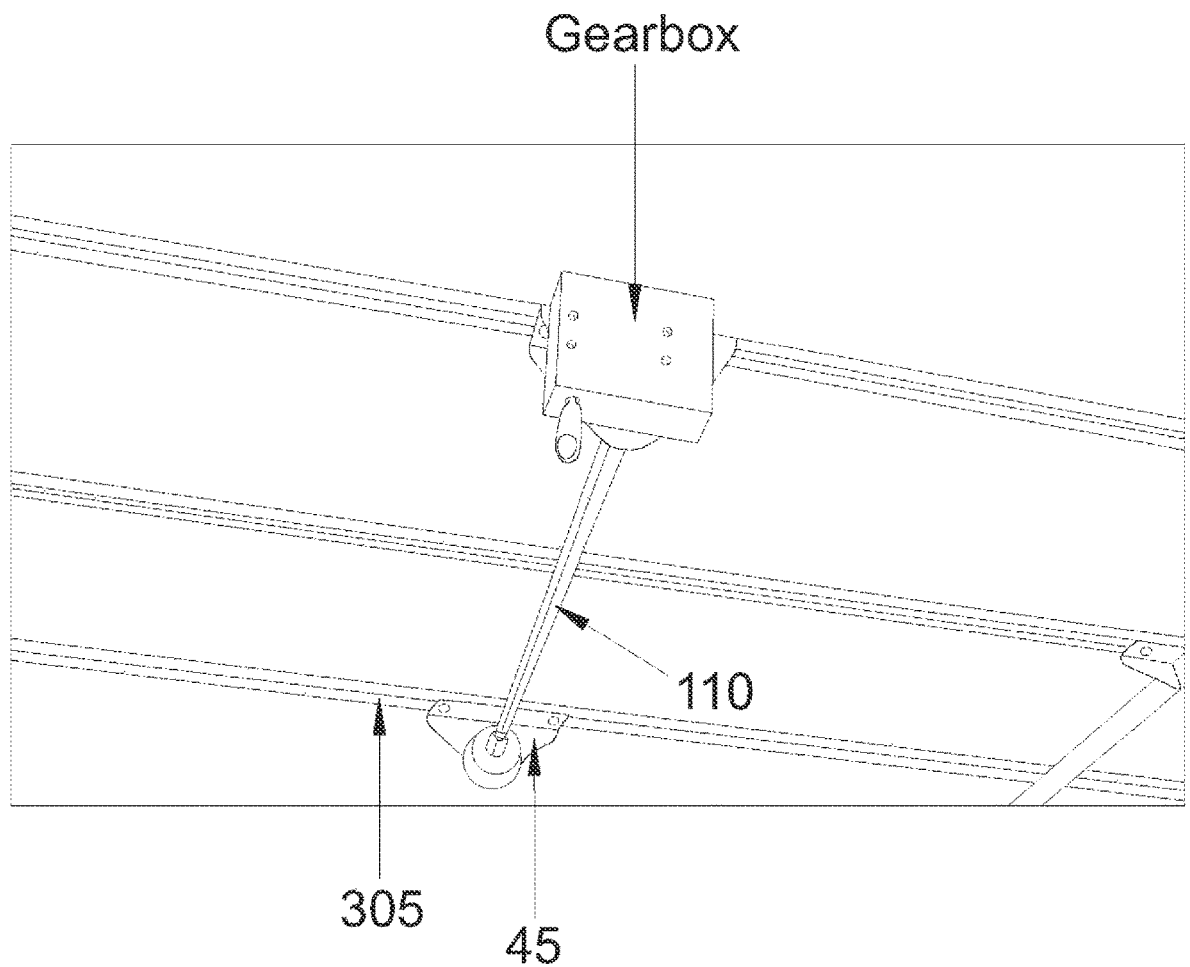
FIG. 22 is a schematic perspective view of the pully connected to the gear box and an elongated member and being connected/instated to the storage apparatus.
Figure 23:
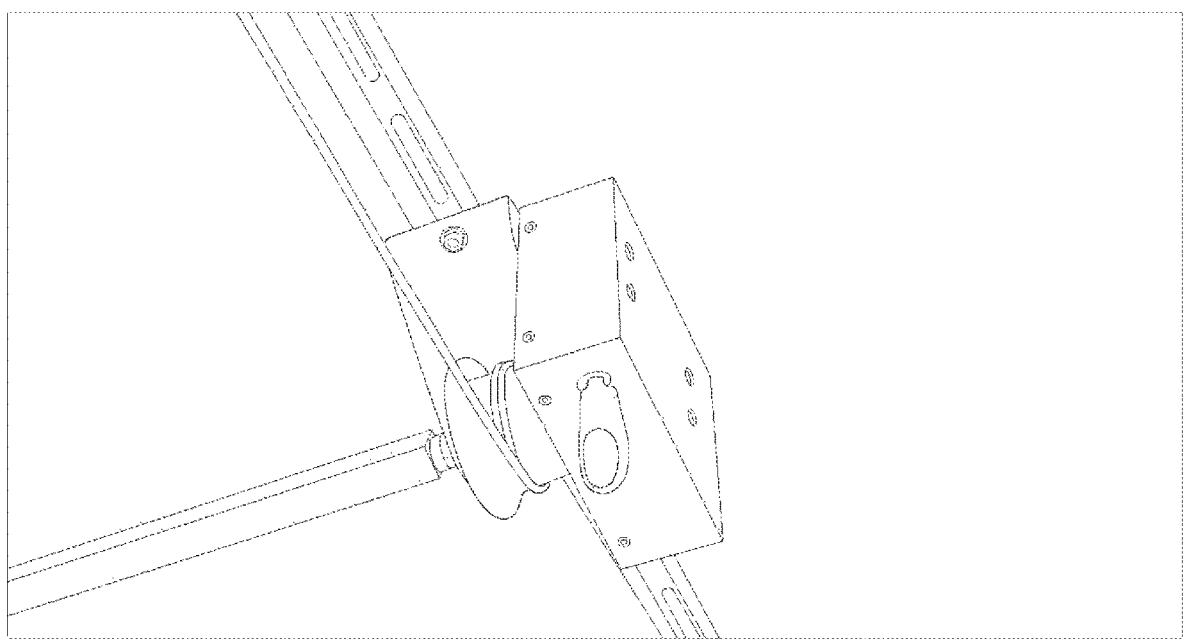
FIG. 23 is a schematic bottom perspective view of the gear box comprising a rotatable member.

The storage apparatus 100 comprises a pully and a rope/cable system. As shown in FIG. 1 and FIGS. 14-19, at least one pully 90 is mounted on at least one storage support element 30. There is at least one pully mounting bracket 45 is attached to the pully 90 in order for the pully to be attached to the storage support element 30. As best seen in FIG. 16, at least one pully mounting bracket 45 comprises at least one T-nut, where the T-nut can be rotated to fit into a channel 305 of a storage support element 30. Preferably, there are a plurality of pullies 90 and a plurality of storage support elements 30. More preferably, there are plurality of pullies 90 mounted on each of the outer storage support elements 30, which are positioned/attached/mounted on a ceiling/rafters 60. An outer storage support element is a storage support element 30 which has only one adjacent storage support element 30 thereby.

FIGS. 20-23 illustrate a means for lowering and raising the platform 20. The means for lowering and raising the platform 20 can be any device 140 or tool which turns a lowering and raising mechanism 100 such as a rotary and/or linear actuator, a power tool or machine such as a drill and/or socket or any other equivalent device. The lowering and raising mechanism 100 can be any apparatus which is used or can raise and/or lower an object such as a gear box (i.e. a container or box including a gear or gears). The lowering and raising mechanism 100 comprise an elongated member 110 which has an aperture 130 therein. The elongated member 110 can rotate around any of the x, y or z axis in a standard x,y,z axis system. The aperture 130 in the elongated member 110 can be used by inserted any device 140 or member therein so as to rotate the elongated member 110 which turns a gear or gears in the lowering and raising mechanism 100 which then raises or lowers the platform 20. The elongated member 110 is positioned on at least one of the outer storage support elements 30 and positioned on the centroid of the outer storage support element 30. For example, when the outer storage support element 30 is a (uniform) rod, the lowering and raising mechanism is positioned in the middle of the rods' length. Applicant has solved the problem of preventing swaying of the platform 20, as well as extending the operating life of the lowering and raising mechanism by preventing shear forces from acting on the lowering and raising mechanism, when the platform 20 of the storage apparatus 100 is lowered and/or raised.

A rope or ropes 40 or a cable or cables 40 is/are positioned on the pullies 90, connected to the means for lowering and raising the platform 20 and attached to at least one pully support 50 such that when the means for lowering and raising the platform 20 turns the lowering and raising mechanism, the platform 20 either lowers or raises. For example, when the lowering and raising mechanism is turned in a clockwise direction, the platform 20 will lower and when the lowering and raising mechanism is turned in a counterclockwise direction, the platform 20 will be raised. However, the turning direction of the lowering and raising mechanism can also operate differently such that when the lowering and raising mechanism is turned in a clockwise direction, the platform 20 will be raised and when the lowering and raising mechanism is turned in a counterclockwise direction the platform 20 will be lowered.

Preferably, there are a plurality of pully supports 50 and each pully support 50 is attached to a support tray 10 and/or a side platform support 2 and/or an end platform support 1. Each of the two ends of a rope or cable 40 are attached/connected to a pully support 50. Therefore, when the lowering and raising mechanism is turned in either a clockwise or counterclockwise direction, the rope or cable 40 will wrap around an element of the lowering and raising mechanism. For example, when the lowering and raising mechanism is turned in say a clockwise direction, the rope or cable 40 will wrap around a pully of the lowering and raising mechanism and cause the effective length of the rope or cable 40 to become shortened and therefore raise the platform 20. Similarly, when the lowering and raising mechanism is turned in say a counterclockwise direction, the rope or cable 40 will unwrap from the pully of the lowering and raising mechanism and cause the effective length of the rope or cable 40 to lengthen and therefore lower the platform 20.

At least one attachment guide 70 is attached/fastened/connected to the storage support elements 30 and/or the ceiling/rafters 60. Preferably, there are a plurality of attachment guides 70 attached/fastened/connected to the storage support elements 30 and some of the attachment guides 70 are attached/fastened/connected to both the storage support elements 30 and the ceiling/rafters 60.

Figure 24:
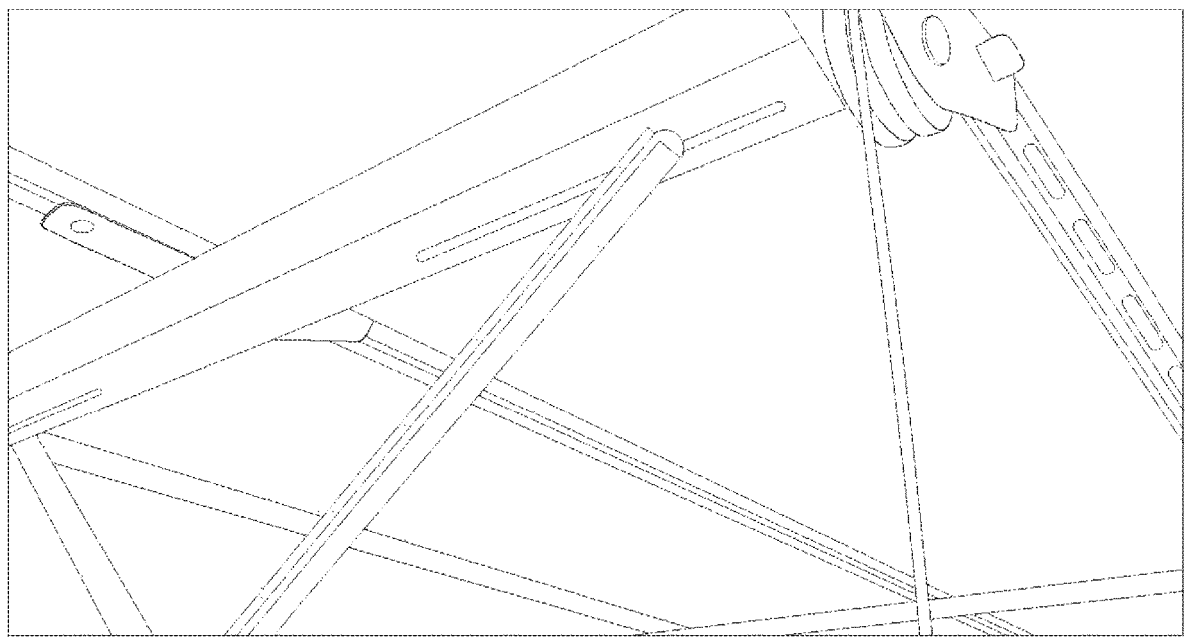
FIG. 24 is schematic perspective view of X-bars in elongated slots of the storage apparatus.
Figure 25:
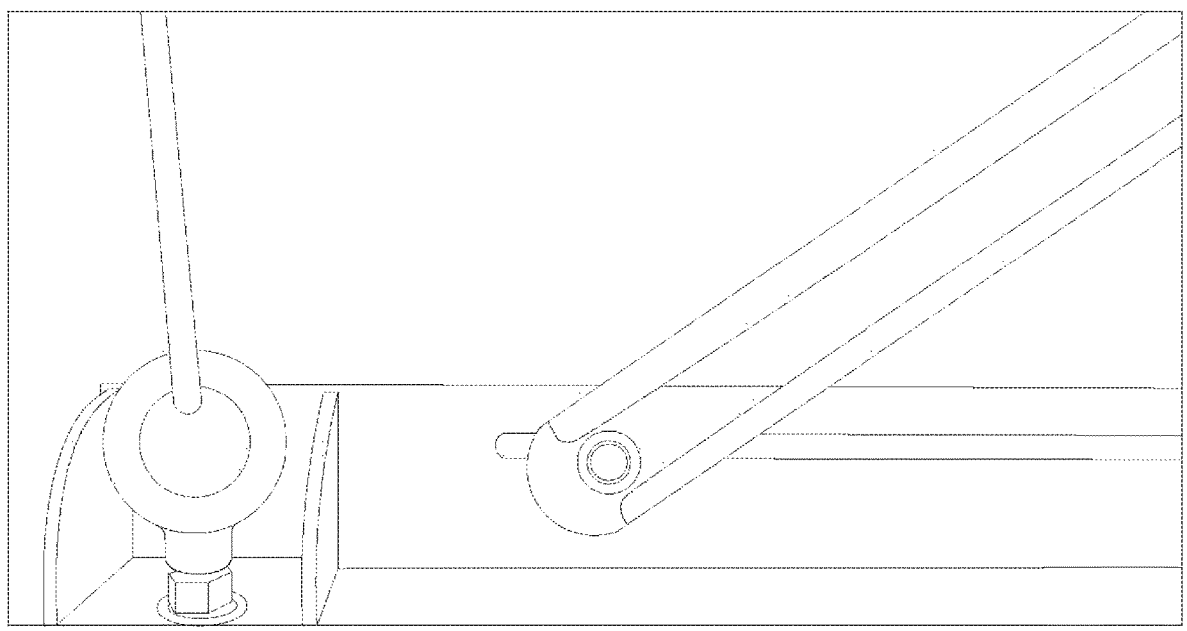
FIG. 25 is a schematic perspective view of the X-bars in elongated slots and connecting members attached to the platform.

As shown in FIG. 1, FIG. 24 and FIG. 25, the storage apparatus 100 also includes X-bars 22. Two pair of X-bars 22 are attached to the storage apparatus 100. However, there can be more or less than two pair of X-bars 22 attached to the storage apparatus 100. Each X-bar 22 has a hole therein and the hole is located at the midpoint of the length of the bar. A screw, rivet, fastener or similar fastening device is installed into the holes of the X-bars 22 in order to connect the X-bars 22 together. The X-bars 22 have the same length in order to keep the platform 20 level when lowering or raising the platform 20. The X-bars 22 are flat bars. Alternatively, the X-bars 22 can be tubular (i.e. circular) shaped or square shaped or any other polygonal shape. The X-bars 22 are made from steel or aluminum or any other metal or a composite metal or a composite material. For one X-bar pair 22, one end of the X-bars 22 is attached to one of the end platform supports 1 (i.e. a first end platform support) and/or the platform 20 and the other end of the X-bars 22 is attached to one of least one attachment guide 70 (i.e. a first attachment guide) and/or the ceiling/rafters 60. In the other pair of X-bars 22 of the two pair of the X-bars, one end the X-bars 22 is connected to one of the end platform supports 1 (i.e. a second end platform support) and/or the platform 20 and the other end of the X-bars 22 is attached to one of the at least attachment guide (i.e. a second attachment guide) and/or the ceiling/rafters 60. The X-bars 22 are attached in elongated slots 120 of the least one attachment guide 70 and the end platform supports 1 and/or the platform 20.

The attached/fastened/connected of the pairs of X-bars 22 can be used with a fitted bracket or brackets and fasteners in order to reduce lateral forces and therefore reduce the platform 20 from moving in a sideways direction. The X-bars 22 can be permanently attached or removable attached by any known connection method of connecting two elements together such as a weld, screws, rivets, or other fastening devices and methods.

The platform 20 and the storage apparatus 100 are made from a material of steel or aluminum or any other metal or a composite metal or a composite material that provides the ability/strength to hold a distributed weight (i.e. distributed across the platform 20) capacity from a few pounds of weight up to 1000 pounds of weight or even more than 1000 pounds of weight in order to support the weight of a given or desired use of the storage apparatus 100. The storage apparatus 100 is approximately four feet in width by seven feet in length. However, the width and/or the length can be shorter or longer than the disclosed four foot width and the seven foot length in order to accommodate the storage apparatus 100 use within a desired location and to meet the required user needs of the quantity and size of the items to be stored. Also, folding legs, pivoting element(s) (i.e. a groove and pin/rod), can be attached to the bottom of the platform 20 and located at each of the corners of the platform 20 in order to help support the load/weight of the storage items installed on the storage apparatus 100.

The operation of the storage apparatus 100 is disclosed below. When a means rotates, for example in a clockwise direction, (for example a drill, socket and extension) the lowering and raising mechanism, the lowering and raising mechanism coils the rope or cable 40 around a pully of the lowering and raising mechanism where the rope or cable 40 will there effective shorted and the X-bars 22 will move in a folding manner and this will raise the platform 20 in a vertical direction. Similarly, when a means rotates, for example in a counterclockwise direction, (for example a drill, socket and extension) the lowering and raising mechanism, the lowering and raising mechanism unwinds the rope or cable 40 from a pully of the lowering and raising mechanism where the rope or cable 40 will there effective lengthen and the X-bars 22 will move in an unfolding manner and this will lower the platform in a vertical direction.

Finally, it should be noted that the above embodiments are only used to illustrate the technical aspects of the present disclosure, rather than limit the embodiments. Although the present disclosure has been described in detail with reference to the foregoing embodiments, it should be understood by a person of ordinary skill in the art that the technical aspects described in the embodiments can still be modified or equivalent substitutions can be made to some or all of the technical features and the modifications or substitutions would not change the substance of the scope of the embodiments of the present disclosure.

What is claimed is:

1. A storage apparatus, comprising a platform, a means for lowering and raising the platform, at least one side support and at least one end support attached to the platform, at least one pully support connected to at least one of the side platform support, the end platform support and the platform, at least one rope or cable attached to the at least one pully support, and at least one storage support element connected to a support structure, wherein the platform comprises a plurality of support trays connected together, wherein the means for lowering and raising the platform comprises a lowering and raising mechanism and the lowering and raising mechanism is a gear box, the lowering and raising mechanism comprises an elongated member and the elongated member has an aperture in the elongated member, wherein the aperture is used by inserting a device or a member in the aperture to rotate the elongated member for turning a gear or gears in the lowering and raising mechanism to raise or lower the platform, wherein the storage apparatus further comprises at least one pair of X-bars, wherein the at least one pair of X-bars has one end connected to a first support tray of the plurality of support trays and another end connected to a ceiling or rafter, and wherein the storage apparatus comprises at least one pully mounting bracket, wherein the at least one pully mounting bracket comprises at least one T-nut and the at least one T-nut is rotated to fit into a channel of the at least one storage support element.

2. The storage apparatus according to claim 1, further comprising a second pair of X-bars, wherein the second pair of X-bars has one end connected to a second support tray of the plurality of support trays and another end connected to a first attachment guide.

3. The storage apparatus according to claim 1, wherein the lowering and raising mechanism is positioned on the at least one storage support element.

4. The storage apparatus according to claim 3, wherein the lowering and raising mechanism is positioned on a centroid of the at least one storage support element.

5. The storage apparatus according to claim 1, wherein the at least one storage support element comprises a middle storage support element and two outer storage support elements.

6. The storage apparatus according to claim 5, wherein the lowering and raising mechanism is positioned on a centroid of at least one of the two outer storage support elements.

7. The storage apparatus according to claim 1, wherein the rope or the cable is positioned on at least one pully, wherein the rope or the cable is connected to the means for lowering and raising the platform and the rope or the cable is attached to the at least one pully support such that when the means for lowering and raising the platform turns the lowering and raising mechanism, the platform either lowers or raises.

8. The storage apparatus according to claim 1, wherein the storage apparatus is four feet in width and seven feet in length.

9. A storage apparatus, comprising a platform, a means for lowering and raising the platform, at least one side support and at least one end support attached to the platform, at least one pully support connected to at least one of the side platform support, the end platform support and the platform, at least one rope or cable attached to the at least one pully support and at least one storage support element connected to a support structure, wherein the platform comprises a plurality of support trays connected together, wherein the means for lowering and raising the platform comprises a lowering and raising mechanism and the lowering and raising mechanism is a gear box, the lowering and raising mechanism comprises an elongated member and the elongated member has an aperture in the elongated member, wherein the aperture is used by inserting a device or a member in the aperture to rotate the elongated member for turning a gear or gears in the lowering and raising mechanism to raise or lower the platform, and comprising at least one pully mounting bracket, wherein the at least one pully mounting bracket comprises at least one T-nut and the at least one T-nut is rotated to fit into a channel of the at least one storage support element.

* * * * *